Aug. 9, 1927.
H. D. CHURCH
1,638,323
ANCHORING DEVICE FOR BRAKES
Filed Aug. 13, 1925
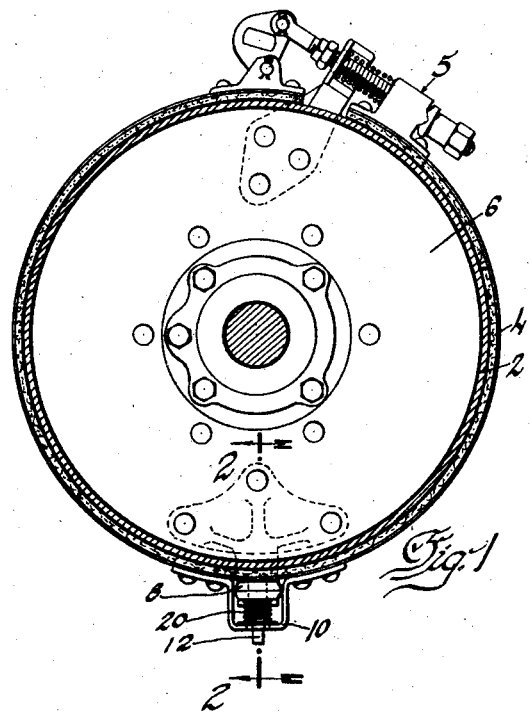
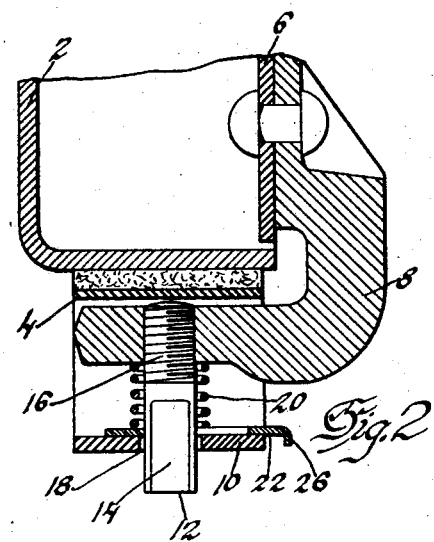
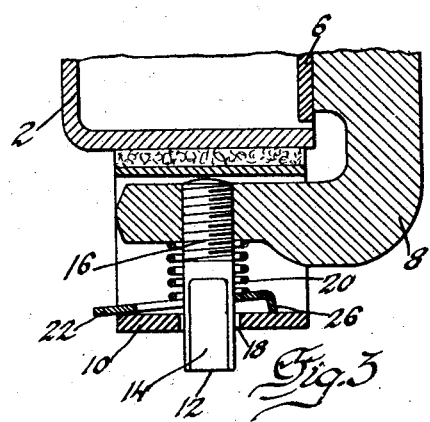
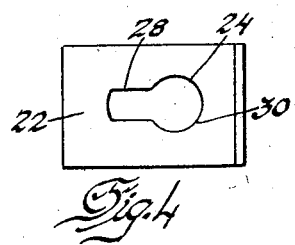
Inventor
Harold D. Church
By Blackmore, Spencer & Hulse
Attorney Patented Aug. 9, 1927.

1,638,323

UNITED STATES PATENT OFFICE.

HAROLD D. CHURCH, OF CLEVELAND, OHIO, ASSIGNOR TO GENERAL MOTORS CORPORATION, OF DETROIT, MICHIGAN, A CORPORATION OF DELAWARE.

ANCHORING DEVICE FOR BRAKES.

Application filed August 13, 1925. Serial No. 50,000.

In this application I have disclosed an improved anchoring means for brakes of the type commonly used on automobiles and in which a brake member in the form of a shoe or band is adapted to be brought into engagement with a brake drum carried by a rotating part, such as a propeller shaft, wheel or axle. In such brakes it is customary to provide a brake anchoring device which will prevent circumferential movement of the brake band but will allow radial adjustment thereof to vary the clearance between the brake member and the drum when the brake is not applied. In my improved brake anchoring device I have embodied means of very simple construction for effectively locking the brake in any desired position of radial adjustment, this device consisting preferably of a slidable key member engaging an adjustable stop which determines the radial positioning of the brake member, in one position permitting free adjustment of the stop and in the other locking it against movement.

In the drawings:

Figure 1 is a side elevation of a brake in which my improvements have been embodied, the drum being shown in section;

Figure 2 is a section on line 2—2 of Figure 1;

Figure 3 is a section corresponding to that shown in Figure 2 but showing the parts in different positions; and Figure 4 is a plan view of the locking plate.

I have shown at 2 a brake drum adapted to be secured to a rotating part such as a vehicle wheel or propeller shaft, not shown. A brake member 4 is adapted to engage the drum, the brake member here shown being of the band type. Any preferred form of device may be used to draw the band into engagement with the drum, and I have indicated one such device by the reference character 5. 6 indicates a fixed part, in this case the usual disk carried by the rear axle housing, and 8 indicates a part or stud projecting outwardly over the brake band 4 and received within a loop 10 secured to the brake band. The stud and loop cooperate to prevent circumferential movement of the band with respect to the drum. 12 indicates a stop having one end flattened as at 14 and having its other end threaded as at 16. This stop is adapted to be inserted through aperture 18 provided in the loop 10 and to have threaded engagement with the stud 8, the stop projecting on the other side of the stud 8 and serving to limit the movement of the band 4 away from the drum in the non-applied position of the brake. A spring 20 encircles the stop 12 and is interposed between the stud 8 and the loop 10. This spring tends to yieldingly hold the brake member 4 against the stop but when the brake is applied the spring is compressed thereby permitting the entire length of the brake member to engage the drum.

It is now apparent that by turning the member 12 the clearance between the brake band and the brake drum may be varied. It is also obvious that it is desirable to provide locking means for holding the stop in adjusted position.

The locking means which I have provided consists of a plate 22 having a key-hole slot 24 therein adapted to encircle the stop, this plate being interposed between the spring 20 and the loop 10. This plate is provided with a down turned end 26 which cooperates with the loop 10 to positively limit the movement of the plate.

With the plate in the position shown in Figure 2 the narrow portion 28 of the key-hole slot 24 is in engagement with the flattened portion 14 of the stop 12 and the stop is thereby held against rotation. The spring 20 forcing the plate 22 against the loop 10 serves to frictionally hold the plate in adjusted position but as a further safeguard against accidental movement of the plate, the down turned portion 26 is provided, this portion cooperating with the edge of the loop 10 to limit the sliding movement of the plate to an amount which will not allow the stop to clear the narrow portion 28 of the key-hole slot.

When it is desired to adjust the stop the plate 22 is moved to the position shown in Figure 3 where the stop rests in the circular portion 30 of the key-hole slot and free rotation of the stop is permitted.

I claim:

1. The combination of a brake drum, a brake member for engagement with said drum, an anchor for said brake member, an adjustable stop associated with said anchor and engaging said brake member, yieldable means for holding said brake member against said stop in one position of the brake, and means held in locking position by said last named means for locking said stop in adjusted position.

2. The combination of a brake drum, a brake member for engagement with said drum, an anchor for said brake member, an adjustable stop having threaded engagement with said anchor, yieldable means tending to hold said member against said stop, and means adapted to engage said stop to hold the latter in adjusted position, said means being held in locking position by said yeldable means.

3. The combination of a brake drum, a brake member for engagement with said drum, an anchor for said brake member, an adjustable stop having threaded engagement with said anchor, the end of said stop being flattened, yieldable means tending to hold said member against said stop, and a locking device comprising a member having a key hole slot therein adapted to cooperate with said flattened portion of the stop in one position permitting free rotation of said stop and in another position holding the stop against movement, said member being held in selected position by said yieldable means.

4. In the structure as defined by claim 3, said last named member and said brake member having cooperating parts to positively lock the said last named member in one position of adjustment.

5. The combination of a brake drum, a brake member for engagement with the drum, a fixed part projecting outwardly over said brake member, an adjustable stop having threaded engagement with said part, a part secured to said brake member and adapted to encircle said stop, a spring encircling said stop and interposed between said parts adapted to yieldingly force said brake member against said stop, and a slidable key member adapted to engage said stop and one of said parts for holding said stop in adjusted position, said key member being interposed between said spring and one of said parts whereby the key is held in adjusted position.

6. The combination of a brake drum, a brake band for engagement with the drum, a loop on said brake band, a fixed anchoring member having its end engaged in said loop for holding the brake band against circumferential movement, a stop in said loop member having threaded engagement with said anchoring member, said stop having its outer end flattened, a plate bearing against the inner surface of said loop and having a key hole slot therein for encircling said stop, said plate having a down turned end for engagement with said loop to limit the movement of the plate when the stop is seated in the narrow portion of the slot whereby the stop is held in adjusted position, and a spring interposed between the plate and the anchoring member.

In testimony whereof I affix my signature.

HAROLD D. CHURCH.